(12) United States Patent
Halbritter et al.

(10) Patent No.: US 9,843,399 B2
(45) Date of Patent: Dec. 12, 2017

(54) RADIATION RECEIVER APPARATUS

(71) Applicant: OSRAM Opto Semiconductors GmbH, Regensburg (DE)

(72) Inventors: Hubert Halbritter, Dietfurt (DE); Markus Lermer, Donaustauf (DE)

(73) Assignee: OSRAM Opto Semiconductors GmbH (DE)

( * ) Notice: Subject to any disclaimer, the term of this patent is extended or adjusted under 35 U.S.C. 154(b) by 0 days.

(21) Appl. No.: 15/036,098

(22) PCT Filed: Nov. 13, 2014

(86) PCT No.: PCT/EP2014/074512
§ 371 (c)(1),
(2) Date: May 12, 2016

(87) PCT Pub. No.: WO2015/074949
PCT Pub. Date: May 28, 2015

(65) Prior Publication Data
US 2016/0277120 A1  Sep. 22, 2016

(30) Foreign Application Priority Data
Nov. 21, 2013 (DE) .................. 10 2013 112 882

(51) Int. Cl.
*H04B 10/60* (2013.01)
*H04B 10/67* (2013.01)
(Continued)

(52) U.S. Cl.
CPC ......... *H04B 10/675* (2013.01); *H04B 10/116* (2013.01); *H04B 10/1141* (2013.01); *H04B 10/671* (2013.01); *H04B 10/672* (2013.01)

(58) Field of Classification Search
CPC ............................ H04B 10/671; H04B 10/675
(Continued)

(56) References Cited

U.S. PATENT DOCUMENTS

| 7,602,434 B2 | 10/2009 | Katsuno et al. |
| 2004/0258369 A1 | 12/2004 | Luo et al. |

(Continued)

FOREIGN PATENT DOCUMENTS

| CN | 1573388 | 2/2005 |
| CN | 1605985 | 4/2005 |

(Continued)

OTHER PUBLICATIONS

Joseph M. Kahn et al., "Wirelss Infrared Communications," Proceedings of the IEEE, vol. 85, No. 2, Feb. 1997, pp. 265-298.
(Continued)

*Primary Examiner* — Don N Vo
(74) *Attorney, Agent, or Firm* — DLA Piper LLP (US)

(57) ABSTRACT

Radiation receiver apparatus with a radiation receiver and a radiation entrance face, wherein the radiation receiver includes an active region that detects radiation with a target wavelength in the near-infrared, an optical element is arranged between the radiation entrance face and the radiation receiver, an optical axis of the optical element extends through the radiation receiver, the optical element is shaped and arranged relative to the radiation receiver such that, of radiation incident on the radiation entrance face at an angle of greater than or equal to 40° to the optical axis, at most 10% is incident on the radiation receiver, and a visible light filter is formed between the radiation receiver and the radiation entrance face.

17 Claims, 2 Drawing Sheets

(51) Int. Cl.
*H04B 10/114* (2013.01)
*H04B 10/116* (2013.01)

(58) Field of Classification Search
USPC .......................................... 398/202
See application file for complete search history.

(56) References Cited

U.S. PATENT DOCUMENTS

| | | |
|---|---|---|
| 2005/0018981 A1 | 1/2005 | Modavis et al. |
| 2005/0185882 A1 | 8/2005 | Zack et al. |
| 2005/0195865 A1 | 9/2005 | Aronson |
| 2010/0119233 A1 | 5/2010 | Hayashi |
| 2010/0193689 A1 | 8/2010 | Yokota |
| 2010/0215378 A1 | 8/2010 | Rajagopal et al. |
| 2012/0008960 A1 | 1/2012 | Kubo et al. |
| 2013/0170049 A1* | 7/2013 | Smirnov ............ G03F 7/70633 359/730 |
| 2014/0111620 A1* | 4/2014 | Park .................... H04N 13/0239 348/46 |
| 2014/0185134 A1* | 7/2014 | Kamitakahara ........ G02B 13/14 359/356 |

FOREIGN PATENT DOCUMENTS

| | | |
|---|---|---|
| CN | 1654997 | 8/2005 |
| CN | 1926727 | 3/2007 |
| CN | 101582720 | 11/2009 |
| DE | 197 37 561 C1 | 4/1999 |
| WO | 2012/173029 A1 | 12/2012 |

OTHER PUBLICATIONS

Vishay Semiconductors, "IR Sensor Module for Remote Control Systems," TSMP77000, www.vishav.com, Rev. 1.3, Sep. 17, 2013, Document No. 82478, pp. 1-9.

* cited by examiner

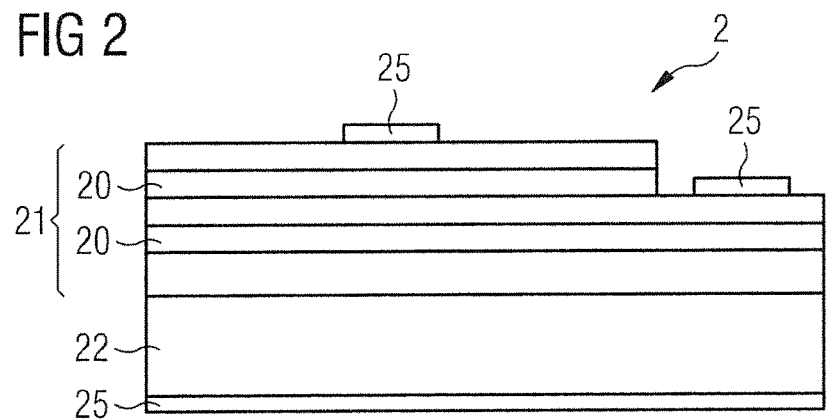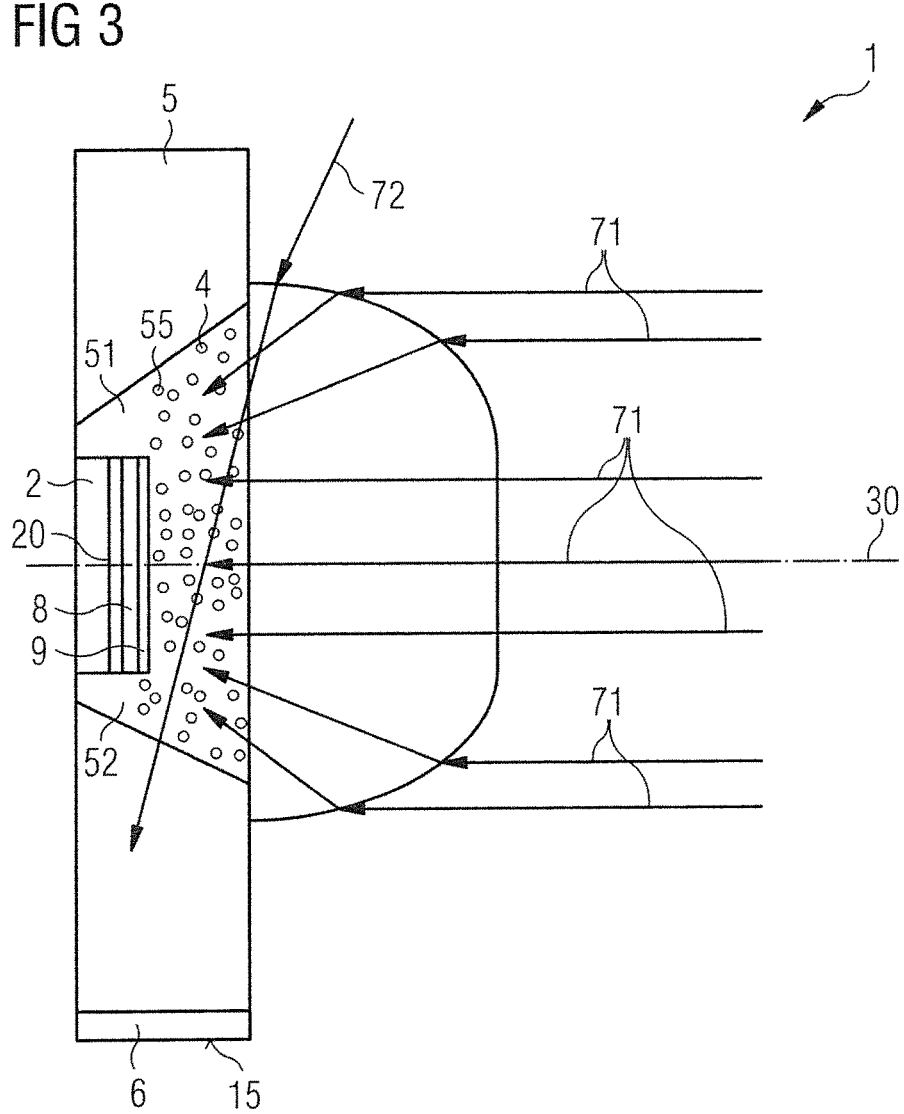

RADIATION RECEIVER APPARATUS

TECHNICAL FIELD

This disclosure relates to a radiation receiver apparatus, in particular for IR communication.

BACKGROUND

For free-space optical communication using infrared radiation, broadband radiation receivers with an electrical bandwidth of for instance 30 kHz to 500 kHz are desirable, which may detect optical pulses with a pulse width of greater than or equal to 1 µs. It has been shown, however, that such receivers often only operate reliably at small ranges of less than a meter. At greater distances ambient light may lead to spurious signals. This is the case in particular with ambient light produced by fluorescent lamps based on the gas discharge principle. Greater ranges may be achieved by electrically narrowband radiation receivers. These reception concepts however explicitly require a known modulation frequency or a known modulation format and are only suitable for this specific use.

It could therefore be helpful to provide a radiation receiver apparatus having both broad usability and at the same time reliable signal acquisition.

SUMMARY

We provide radiation receiver apparatus with a radiation receiver and a radiation entrance face, wherein the radiation receiver includes an active region that detects radiation with a target wavelength in the near-infrared, an optical element is arranged between the radiation entrance face and the radiation receiver, an optical axis of the optical element extends through the radiation receiver, the optical element is shaped and arranged relative to the radiation receiver such that, of radiation incident on the radiation entrance face at an angle of greater than or equal to 40° to the optical axis, at most 10% is incident on the radiation receiver, and a visible light filter is formed between the radiation receiver and the radiation entrance face.

We also provide radiation receiver apparatus with a radiation receiver and with a radiation entrance face, wherein the radiation receiver includes an active region that detects radiation with a target wavelength in the near-infrared, an optical element is arranged between the radiation entrance face and the radiation receiver, an optical axis of the optical element extends through the radiation receiver, the optical element is shaped and arranged relative to the radiation receiver such that, of radiation incident on the radiation entrance face at angle of greater than or equal to 40° to the optical axis, at most 10% is incident on the radiation receiver, a visible light filter is formed between the radiation receiver and the radiation entrance face, and the radiation receiver apparatus further includes a semiconductor filter in addition to the visible light filter, the semiconductor filter being arranged between the radiation receiver and the radiation entrance face to suppress radiation of a wavelength smaller than a cut-off wavelength, wherein the cut-off wavelength is smaller than the target wavelength.

BRIEF DESCRIPTION OF THE DRAWINGS

FIG. 2 shows an example of a radiation receiver.

FIG. 3 shows a second example of a radiation receiver apparatus.

DETAILED DESCRIPTION

Figure 1A:
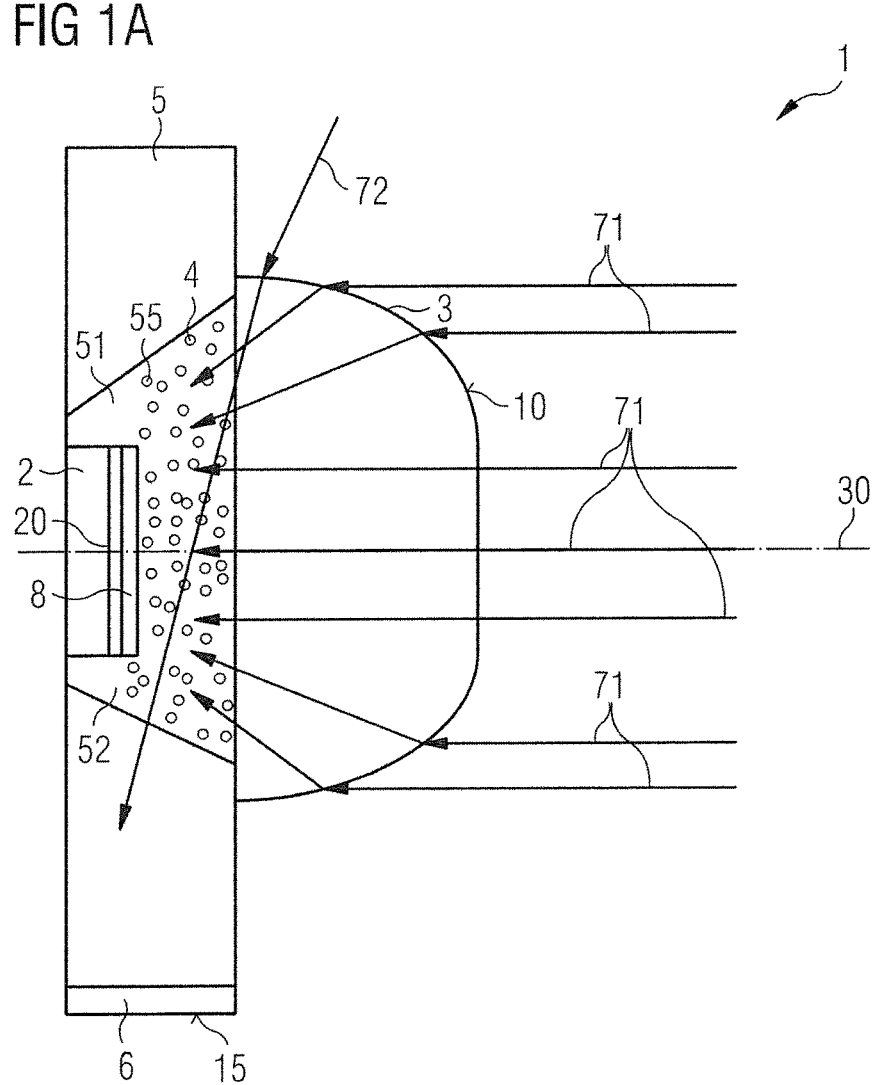
FIGS. 1A and 1B show a first example of a radiation receiver apparatus in sectional view (FIG. 1A) and associated side view (FIG. 1B).

The radiation receiver apparatus may comprise a radiation receiver. The radiation receiver comprises in particular an active region that detects radiation with a target wavelength in the near-infrared. Near-infrared is understood to mean a spectral range of 0.78 µm to 3 µm. For example, a target wavelength of the radiation receiver is 820 nm to 980 nm. The target wavelength is conveniently equal to a peak wavelength of the spectral sensitivity distribution of the radiation receiver or at least deviates only insignificantly therefrom, for example, by at most 20 nm.

The active region is based, for example, on an arsenide compound semiconductor material.

"Based on arsenide compound semiconductors" means that the active epitaxial layer sequence or at least one layer thereof comprises an arsenide III-V compound semiconductor material, preferably $Al_nGa_mIn_{1-n-m}As$, wherein $0 \leq n \leq 1$, $0 \leq m \leq 1$ and $n+m \leq 1$. This material does not absolutely have to exhibit a mathematically exact composition according to the above formula. Instead, it may comprise one or more dopants and additional constituents that do not substantially modify the characteristic physical properties of the $Al_nGa_mIn_{1-n-m}As$ material. For simplicity's sake, however, the above formula includes only the fundamental constituents of the crystal lattice (Al, Ga, In, As), even if these may in part be replaced by small quantities of further substances.

Alternatively, a radiation receiver with an active region based on another semiconductor material, in particular based on silicon, may also be used.

The radiation receiver apparatus may comprise a radiation entrance face. The radiation entrance face is that face through which the target radiation to be detected enters when the radiation receiver is in operation.

The radiation receiver apparatus may comprise an optical element. In particular, an optical axis of the optical element extends through the radiation receiver. The optical element may be configured as an individual element, for example, as a lens or as a multipart element, for example, as a combination of lenses or a combination of a lens and an aperture.

The optical element is arranged in particular between the radiation entrance face and the radiation receiver. For example, a face of the optical element remote from the radiation receiver forms the radiation entrance face.

The optical element may be shaped and arranged relative to the radiation receiver such that, of radiation incident on the radiation entrance face at an angle of greater than or equal to 40° to the optical axis, at most 10% is incident on the radiation receiver. In other words, an angle-dependent sensitivity distribution of the radiation receiver apparatus decreases from a maximum value at an angle of 0° to the optical axis to at most 10% of the maximum value at an angle of at most 40° and remains below 10% up to an angle of 90°. The sensitivity distribution preferably decreases from the angle of at most 40° to at most 5% of the maximum value. In particular, for radiation with an angle of incidence greater than this angle there is, according to geometrical optics, no direct ray path from the radiation entrance face to the radiation receiver. A direct ray path means an optical path in which the radiation may travel from the radiation entrance face to the active region of the radiation receiver without reflection within the radiation receiver apparatus. The radiation receiver apparatus thus predominantly detects radiation incident on the radiation entrance face at a comparatively small angle to the optical axis. Angles of greater than or equal to 40° are also hereinafter designated "large angles." Small angles are accordingly in particular angles smaller than 40°.

A visible light filter may be formed between the radiation receiver and the radiation entrance face. The visible light filter is provided to filter radiation in the visible spectral range such that these radiation components make no contribution or at least no significant contribution to the signal of the radiation receiver apparatus. Preferably, the visible light filter's transmittance to radiation in the visible spectral range amounts to at most 10%, particularly preferably at most 5%.

The radiation receiver apparatus may comprise a radiation receiver and a radiation entrance face, wherein the radiation receiver comprises an active region that detects radiation with a target wavelength in the near-infrared. An optical element is arranged between the radiation entrance face and the radiation receiver. An optical axis of the optical element extends through the radiation receiver. The optical element is shaped and arranged relative to the radiation receiver such that, of radiation incident on the radiation entrance face at an angle of greater than or equal to 40° to the optical axis, at most 10% is incident on the radiation receiver. A visible light filter is formed between the radiation receiver and the radiation entrance face.

As a result of the shaping and arrangement of the optical element relative to the radiation receiver, the radiation predominantly incident on the radiation receiver is radiation extending at a comparatively small angle to the optical axis. When the radiation receiver apparatus is in operation, the apparatus is typically arranged in a room such that the optical axis extends in a horizontal direction or at a slight deviation of at most 10° relative to the horizontal direction. In contrast, interfering radiation from ceiling lighting is incident at large angles relative to the optical axis and consequently not focused onto the radiation receiver by the optical element. Furthermore, the visible light filter filters out spectral components in the visible spectral range. We found that, through this angle-selective and wavelength-selective filtering of the radiation incident on the radiation entrance face, a broadband radiation receiver apparatus with high detection reliability may be achieved. Despite per se undesirable narrowing of the angular range within which the radiation receiver apparatus exhibits high sensitivity, the performance of the radiation receiver apparatus may in this way be improved overall.

It is however also possible to dispense with the angle-selective filtering by the optical element, for example, if the sensitivity requirements regarding interfering radiation are less stringent or the wavelength-selective filtering suppresses interfering radiation to such an extent that additional angle-selective filtering can be dispensed with.

At an angle of 15° to 25° to the optical axis angle-dependent sensitivity distribution of the radiation receiver apparatus decreases to half the value for an angle of 0°. We found that such angle-dependent sensitivity distribution on the one hand enables efficient detection of the target radiation to be detected and at the same time reduces the voltage component generated by undesired stray radiation.

The radiation receiver may be embedded in an enclosure. The enclosure may serve in particular as encapsulation for protection from external influences, for example, moisture or dust. The enclosure, for example, contains a silicone or an epoxide or a hybrid material containing a silicone and an epoxide. The enclosure extends in particular in places between the radiation receiver and the radiation entrance face.

The visible light filter may be formed by a filler in the enclosure. The enclosure is thus formed by the filler such that radiation in the visible spectral range is blocked while transmission of radiation of the target wavelength continues.

Examples of suitable fillers are an organic colorant or a mixture of a plurality of organic colorants.

An interfering radiation filter is arranged between the radiation receiver and the optical element to suppress interfering radiation in the near-infrared or in the visible spectral range. The interfering radiation is modulated in particular with modulation frequencies in the kilohertz range, i.e., with a frequency of 1 kHz to 1000 kHz.

The interfering radiation filter preferably suppresses interfering radiation with an interfering wavelength relative to the target wavelength of the radiation receiver with a contrast ratio of at least 1:50, particularly preferably with a contrast ratio of at least 1:100.

The interfering radiation filter is configured, for example, as a dielectric filter, a plasmonic filter or a color filter.

The interfering wavelength may be greater than the target wavelength. The interfering wavelength is 1014 nm, for example. We found that radiation of this wavelength is a characteristic radiation of fluorescent lamps containing mercury. The interfering radiation may, however, alternatively or additionally also contain radiation components the wavelength of which is smaller than the target wavelength, for example, a wavelength of 820 nm. In particular, at least one radiation component filtered by the interfering radiation filter is narrowband compared to the overall ambient light. For example, the interfering radiation comprises at least one radiation component with a full width at half maximum, (FWHM) of at most 50 nm.

Any radiation components incident at a large angle to the optical axis are already suppressed by the optical element such that filters are also suitable for the interfering radiation filter that achieve the desired filter action only at a small angle to the optical axis. The combination of angle-dependent selection by the optical element and wavelength-dependent selection by the interfering radiation filter is therefore particularly suitable to suppress interfering radiation caused, for example, by fluorescent lamps.

A semiconductor filter may be arranged between the radiation receiver and the radiation entrance face to suppress radiation of a wavelength smaller than a cut-off wavelength, wherein the cut-off wavelength is smaller than the target wavelength.

Such a semiconductor filter is suitable in particular to absorb short wavelength radiation and at the same time transmit long wavelength radiation, wherein short wavelength and long wavelength relate to the cut-off wavelength.

Such a semiconductor filter may form the visible light filter or be provided in addition to the visible light filter. The radiation absorbed by the semiconductor filter may in particular comprise radiation in the visible spectral range and radiation in the near-infrared, which is smaller than the target wavelength. The semiconductor filter contains an arsenide compound semiconductor material, for example. The aluminum content of the semiconductor filter is, for example, higher than the aluminum content of the active region such that the cut-off wavelength is smaller than the target wavelength of the active region.

The radiation receiver may comprise a plurality of active regions arranged along the optical axis. The active regions are in particular arranged spaced from one another along the optical axis. The active regions are, for example, each formed by pn junctions. By a plurality of active regions, for example, between two active regions and five active regions inclusive, the contrast ratio between the target radiation to be detected and the interfering radiation may be improved to a greater extent, for example, by a factor of 1:2.

For example, the signals generated in the active regions when the radiation receiver apparatus is in operation may be individually tapped at the radiation receiver. By subtraction of these signal components, an improved contrast ratio between the target wavelength and the interfering wavelength may be simply achieved.

The radiation receiver apparatus may comprise an electrical bandwidth of 20 kHz to 800 kHz, preferably 30 kHz to 500 kHz. The carrier frequency for data transmission is thus variable within broad limits such that the radiation receiver apparatus is universally applicable. The radiation receiver apparatus is thus not designed for a specific carrier frequency and limited thereto, but rather allows any desired carrier frequencies in the stated frequency range.

At the same time, the radiation receiver apparatus is distinguished by a high level of insensitivity to interfering radiation such that the radiation receiver apparatus is also suitable for ranges of 1 m or more, for example, for ranges of 5 m.

The radiation receiver apparatus may be configured as a surface-mountable device (Surface Mounted Device, SMD). Such a device is distinguished by simple mountability, for example, on a connection carrier such as a printed circuit board.

A mounting surface of the in particular surface-mountable device may extend parallel to the optical axis. On a connection carrier oriented in a horizontal direction, the radiation receiver apparatus thus receives radiation predominantly extending in the horizontal direction or at a small angle to the horizontal direction, while radiation extending at a large angle to the horizontal direction, for example, radiation from ceiling lighting is not incident or is incident only to an insignificant extent on the radiation receiver.

Further features, configurations and convenient aspects are revealed by the following description of the examples in conjunction with the figures.

Identical, similar or identically acting elements are provided with the same reference numerals in the figures.

The figures and the size ratios of the elements illustrated in the figures relative to one another are not to be regarded as being to scale. Rather, individual elements and in particular layer thicknesses may be illustrated on an exaggeratedly large scale for greater ease of depiction and/or better comprehension.

Figure 1B:
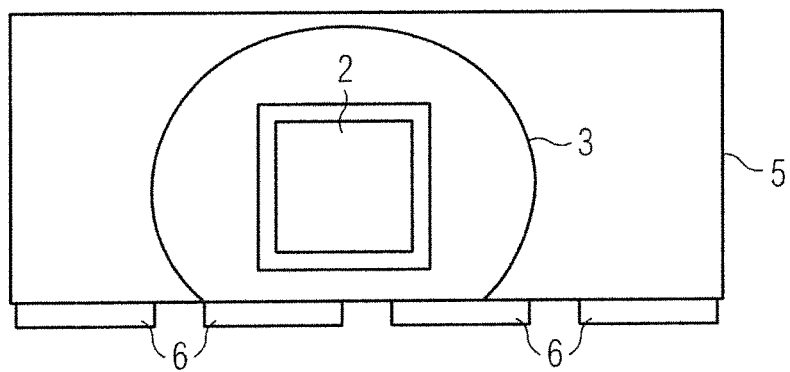

FIGS. 1A and 1B are schematic representations of an example of a radiation receiver apparatus, the side view shown in FIG. 1B showing a plan view onto a radiation entrance face 10 of the radiation receiver apparatus 1.

The radiation receiver apparatus 1 comprises a radiation receiver 2 with an active region 20 that receives radiation in the near-infrared. The radiation receiver apparatus, for example, receives radiation in a spectral range of 820 nm to 980 nm, for example, 950 nm. The active region 20, for example, contains an arsenide compound semiconductor material. Alternatively, the radiation receiver may also be based on silicon. For example, the radiation receiver is configured as a photodiode, a phototransistor or as an application-specific integrated circuit (ASIC) with a light-sensitive region.

The radiation receiver apparatus 1 further comprises an optical element 3 with an optical axis 30. The optical axis extends through the radiation receiver 2, in particular through the centroid of the area of the active region 20. The optical element 3 forms the radiation entrance face 10 of the radiation receiver apparatus 1.

The radiation receiver 2 is arranged in a cavity 51 of a package 5 of the radiation receiver apparatus. The package 5, for example, comprises a plastics molding. The optical element 3 is fastened to the package 5, for example, by a bonding layer, for instance an adhesive layer, or by a mechanical connection, for instance a latching connection or a snap-fit connection. Details of the fastening are not shown in the figures to simplify the illustration.

The radiation receiver apparatus further comprises a visible light filter 4. The visible light filter 4 is arranged between the radiation receiver 2 and the radiation entrance face 10. The visible light filter 4 is formed by a filler 55 in the form of particles, arranged in an enclosure 52 in which the radiation receiver 2 is embedded. Examples of suitable fillers are an organic colorant or a mixture of a plurality of organic colorants.

In contrast thereto, however, the visible light filter 4 may, for example, also be formed by a prefabricated element which in particular fully covers the radiation receiver 2 when viewed in side view along the optical axis 30.

The optical element 3 is shaped and arranged relative to the radiation receiver such that radiation incident on the radiation entrance face 10 at an angle of greater than or equal to 40% to the optical axis is not incident on the radiation receiver 2 or at least is incident thereon only in a proportion of at most 10%. This radiation component incident at large angles relative to the optical axis, which is not incident on the radiation receiver 2, is illustrated in FIG. 1A by an arrow 72. For this radiation component there is no direct ray path between the radiation entrance face and the active region 20 of the radiation receiver.

Radiation incident parallel to the optical axis or at small angles to the optical axis, for example, at angles of at most 25°, passes through the optical element 3 and focused onto the radiation receiver 2. This radiation component is shown by arrows 71.

Radiation incident on the radiation entrance face 10 at large angles is thus guided past the radiation receiver 2. This may be achieved in particular in that the lateral extent of the active region of the radiation receiver 2, i.e., the extent perpendicular to the optical axis 30, the focal length of the optical element 3 and the distance between the optical element 3 and the radiation receiver 2 are adapted to one another such that the undesired radiation component is not incident on the radiation receiver 2.

The optical element 3 is configured as an element whose central region through which the optical axis 30 extends is configured perpendicular to the optical axis. The central region is surrounded by a convexly curved region. At variance therewith, however, an optical element with a continuously convexly curved radiation entrance face, for instance in the form of a truncated spherical lens, may, for example, also be used for the optical element 3. Other configurations of the optical element, for example, an arrangement with more than one lens and/or one aperture, are also possible.

The visible light filter 4 and the angle-selective configuration of the optical element 3 filter out on the one hand undesired spectral components in the visible spectral range and on the other hand undesired angular components. If the radiation receiver apparatus 1 is mounted such that the optical axis 30 extends in the horizontal direction, ambient radiation emitted by ceiling lighting is incident on the radiation entrance face 10 at such a large angle that this radiation component does not provide any or at least provides only a greatly reduced signal component.

The radiation receiver apparatus 1 further comprises an interfering radiation filter 8. The interfering radiation filter 8 is arranged between the radiation receiver 2 and the radiation entrance face 10 and is thus located in the beam path of the radiation coupled into the radiation receiver apparatus 1.

The interfering radiation filter 8 is, for example, a dielectric filter. A dielectric filter is particularly suitable for very efficiently blocking spectrally narrowband interfering radiation components, for instance with a full width at half maximum (FWHM) of at most 50 nm, and at the same time transmitting the target radiation. As an alternative to a dielectric filter, however, another filter, for example, a color filter or a plasmonic filter may also be used. The interfering radiation filter is provided in particular to suppress interfering radiation in the near-infrared and/or in the visible spectral range, wherein these radiation components may in particular be modulated with a modulation frequency in the kilohertz range. Such radiation components could be misinterpreted on incidence on the radiation receiver 2 as an incident light pulse of a target radiation.

In particular, the interfering radiation filter 8 may also filter out interfering radiation of an interfering wavelength larger than the target wavelength. Fluorescent lamps, for example, exhibit interfering radiation with a characteristic interfering wavelength of 1014 nm. This radiation component is produced by a characteristic wavelength of mercury and is narrowband compared with overall ambient light. However, the interfering radiation may alternatively or additionally also have other radiation components with wavelengths smaller than the target wavelength. For example, the interfering wavelength may lie in the near-infrared below the target wavelength, for example, at 820 nm or in the visible spectral range.

The interfering radiation filter is preferably configured such that it suppresses interfering radiation with an interfering wavelength relative to the target wavelength of the radiation receiver 2 with a contrast ratio of at least 1:50, particularly preferably of at least 1:100. The greater the contrast ratio, the lower the risk of the radiation receiver being impaired by the interfering radiation. The stated contrast ratio relates in particular to a peak wavelength of a narrowband interfering radiation component.

With such an interfering radiation filter 8, it is thus possible particularly efficiently to filter out modulated interfering radiation components of fluorescent lamps leading to a spurious signal. Such an interfering radiation filter 8 is, however, not absolutely necessary and may in particular also be omitted if the requirements of robustness relative to interfering radiation are less stringent.

Furthermore, unlike in the example shown, it is also feasible to dispense with an angle-selective optical element, for example, if the wavelength-selective filtering, for instance by the interfering radiation filter 8, is sufficiently efficient, in particular also for large angles of incidence, as to render additional angle-selective filtering unnecessary.

The radiation receiver apparatus 1 is configured as a surface-mountable device in which a mounting surface 15 extends parallel to the optical axis 30. When the radiation receiver apparatus is mounted on a connection carrier extending in the horizontal direction in the room, the radiation receiver apparatus 1 thus predominantly detects target radiation extending in the horizontal direction or at a small angle to the horizontal direction, while radiation incident at large angles to the horizontal direction, for example, from ceiling lighting is largely filtered out. The radiation receiver apparatus is, for example, suitable to detect a signal from an electrical appliance remote control.

On the mounting surface 15 the radiation receiver apparatus comprises contacts 6 for external electrical contacting of the radiation receiver apparatus. The contacts serve, for example, to supply voltage to the radiation receiver and output a signal from the radiation receiver apparatus. The radiation receiver apparatus may comprise one or more additional active or passive electrical components, for example, a resistor, a capacitor, a transistor, a pre-amplifier or an evaluation circuit (not shown explicitly in the figures to simplify representation).

With the described suppression of undesired radiation components, the radiation receiver apparatus may be distinguished by a high electrical bandwidth of 20 kHz to 800 kHz, for example, 30 kHz to 500 kHz such that pulses to be detected with a pulse duration of greater than or equal to 1 μs may be reliably detected irrespective of carrier frequency.

In particular, the risk of a spurious signal due to ambient light produced, for example, by fluorescent lamps is reduced. Furthermore, the radiation receiver apparatus may be distinguished by a range of more than 1 m, for example, a range of 5 m or more.

FIG. 2 shows an example of a radiation receiver 2.

The radiation receiver 2 comprises a semiconductor body 21 arranged on a carrier 22. The carrier is, for example, a growth substrate for epitaxial deposition of semiconductor layers for the semiconductor body. The radiation receiver, in particular the semiconductor body, comprises by way of example two active regions 20 arranged one above the other. Furthermore, the radiation receiver 2 comprises three lands 25 to electrically contact the radiation receiver. By these lands, the two active regions 20 are mutually independently contactable. By subtraction of the signals of the two active regions 20, the wavelength-selective receive characteristic of the radiation receiver 2 may be further increased. For example, between a target wavelength of 940 nm and an interfering wavelength of 1013 nm a contrast ratio of 1:2 may be achieved. The radiation receiver 2 may also comprise more than two active regions 20 or indeed just one active region 20.

The second example of a radiation receiver apparatus 1 shown in FIG. 3 substantially corresponds to the first example described in connection with FIGS. 1A and 1B. Unlike in those figures, the radiation receiver apparatus 1 additionally comprises a semiconductor filter 9. The semiconductor filter suppresses radiation of a wavelength smaller than a cut-off wavelength. The cut-off wavelength is provided by the band gap of the semiconductor material of the semiconductor filter. The cut-off wavelength is conveniently smaller than the target wavelength such that radiation of the target wavelength is not absorbed by the semiconductor filter and may pass largely unimpeded through the semiconductor filter. The semiconductor filter, for example, contains an arsenide compound semiconductor material with an aluminum content greater than the aluminum content of the active region. Semiconductor material is distinguished, in particular in the region of the band gap, by a very high absorption coefficient, in particular of at least 5000/cm, for example, of 10000/cm such that even comparatively small layer thicknesses bring about efficient radiation absorption.

The cut-off wavelength may lie in the visible spectral range or in the near-infrared. The semiconductor filter 9 may be provided in addition or as an alternative to the visible light filter 4, which in the example shown is formed by a filler 55.

This application claims priority of DE 10 2013 112 882.3, the subject matter of which is incorporated herein by reference.

Our apparatus is not restricted by the description given with reference to the examples. Rather, this disclosure encompasses any novel feature and any combination of features, including in particular any combination of features in the appended claims, even if the feature or combination is not itself explicitly indicated in the claims or the examples.

The invention claimed is:

1. Radiation receiver apparatus with a radiation receiver and with a radiation entrance face, wherein
   the radiation receiver comprises an active region that detects radiation with a target wavelength in the near-infrared;
   an optical element is arranged between the radiation entrance face and the radiation receiver;
   an optical axis of the optical element extends through the radiation receiver;
   the optical element is shaped and arranged relative to the radiation receiver such that, of radiation incident on the radiation entrance face at an angle of greater than or equal to 40° to the optical axis, at most 10% is incident on the radiation receiver;
   a visible light filter is formed between the radiation receiver and the radiation entrance face; and
   the radiation receiver apparatus further comprises a semiconductor filter in addition to the visible light filter, the semiconductor filter being arranged between the radiation receiver and the radiation entrance face to suppress radiation of a wavelength smaller than a cut-off wavelength, wherein the cut-off wavelength is smaller than the target wavelength.

2. The radiation receiver apparatus according to claim 1, wherein, at an angle of 15° to 25° to the optical axis an angle-dependent sensitivity distribution of the radiation receiver apparatus decreases to half the value at an angle of 0°.

3. The radiation receiver apparatus according to claim 1, wherein the radiation receiver is embedded in an enclosure and the visible light filter is formed by a filler in the enclosure.

4. The radiation receiver apparatus according to claim 1, wherein an interfering radiation filter is arranged between the radiation receiver and the optical element to suppress interfering radiation in the near-infrared or the visible spectral range with modulation frequencies in the kHz range.

5. The radiation receiver apparatus according to claim 4, wherein the interfering radiation filter suppresses interfering radiation with an interfering wavelength relative to the target wavelength of the radiation receiver with a contrast ratio of at least 1:50.

6. The radiation receiver apparatus according to claim 5, wherein the interfering wavelength is larger than the target wavelength.

7. The radiation receiver apparatus according to claim 5, wherein the interfering wavelength is 1014 nm and the target wavelength is 920 nm to 960 nm.

8. The radiation receiver apparatus according to claim 1, wherein a semiconductor filter is arranged between the radiation receiver and the radiation entrance face to suppress radiation of a wavelength smaller than a cut-off wavelength, and the cut-off wavelength is smaller than the target wavelength.

9. The radiation receiver apparatus according to claim 1, wherein the radiation receiver comprises a plurality of active regions arranged along the optical axis.

10. The radiation receiver apparatus according to claim 9, wherein the signals generated in the active regions when the radiation receiver apparatus is in operation may be individually tapped at the radiation receiver.

11. The radiation receiver apparatus according to claim 1, wherein the radiation receiver apparatus comprises an electrical bandwidth of 20 kHz to 800 kHz.

12. The radiation receiver apparatus according to claim 1, wherein the radiation receiver apparatus is configured as a surface-mountable device.

13. The radiation receiver apparatus according to claim 12, wherein a mounting surface of the surface-mountable device extends parallel to the optical axis.

14. The radiation receiver apparatus according to claim 1, wherein the optical element comprises a lens and an angle-dependent sensitivity distribution of the radiation receiver apparatus decreases from a maximum value at an angle of 0° to the optical axis to at most 10% of the maximum value at an angle of at most 40°.

15. The radiation receiver apparatus of claim 1, wherein the semiconductor filter contains an arsenide compound semiconductor material with an aluminum content greater than an aluminum content of the active region.

16. Radiation receiver apparatus with a radiation receiver and a radiation entrance face, wherein
   the radiation receiver comprises an active region that detects radiation with a target wavelength in the near-infrared;
   an optical element is arranged between the radiation entrance face and the radiation receiver;
   an optical axis of the optical element extends through the radiation receiver;
   the optical element is shaped and arranged relative to the radiation receiver such that, of radiation incident on the radiation entrance face at an angle of greater than or equal to 40° to the optical axis, at most 10% is incident on the radiation receiver;
   a visible light filter is formed between the radiation receiver and the radiation entrance face; and
   the radiation receiver is embedded in an enclosure and the visible light filter is formed by a filler in the enclosure.

17. Radiation receiver apparatus with a radiation receiver and a radiation entrance face, wherein
   the radiation receiver comprises an active region that detects radiation with a target wavelength in the near-infrared;
   an optical element is arranged between the radiation entrance face and the radiation receiver;
   an optical axis of the optical element extends through the radiation receiver;
   the optical element is shaped and arranged relative to the radiation receiver such that, of radiation incident on the radiation entrance face at an angle of greater than or equal to 40° to the optical axis, at most 10% is incident on the radiation receiver;
   a visible light filter is formed between the radiation receiver and the radiation entrance face;
   the radiation receiver comprises a plurality of active regions arranged along the optical axis; and
   the signals generated in the active regions when the radiation receiver apparatus is in operation may be individually tapped at the radiation receiver.

* * * * *